April 16, 1929.    D. M. SOLENBERGER ET AL    1,709,752
REAR VISION MIRROR
Filed Jan. 4, 1929    2 Sheets-Sheet 2
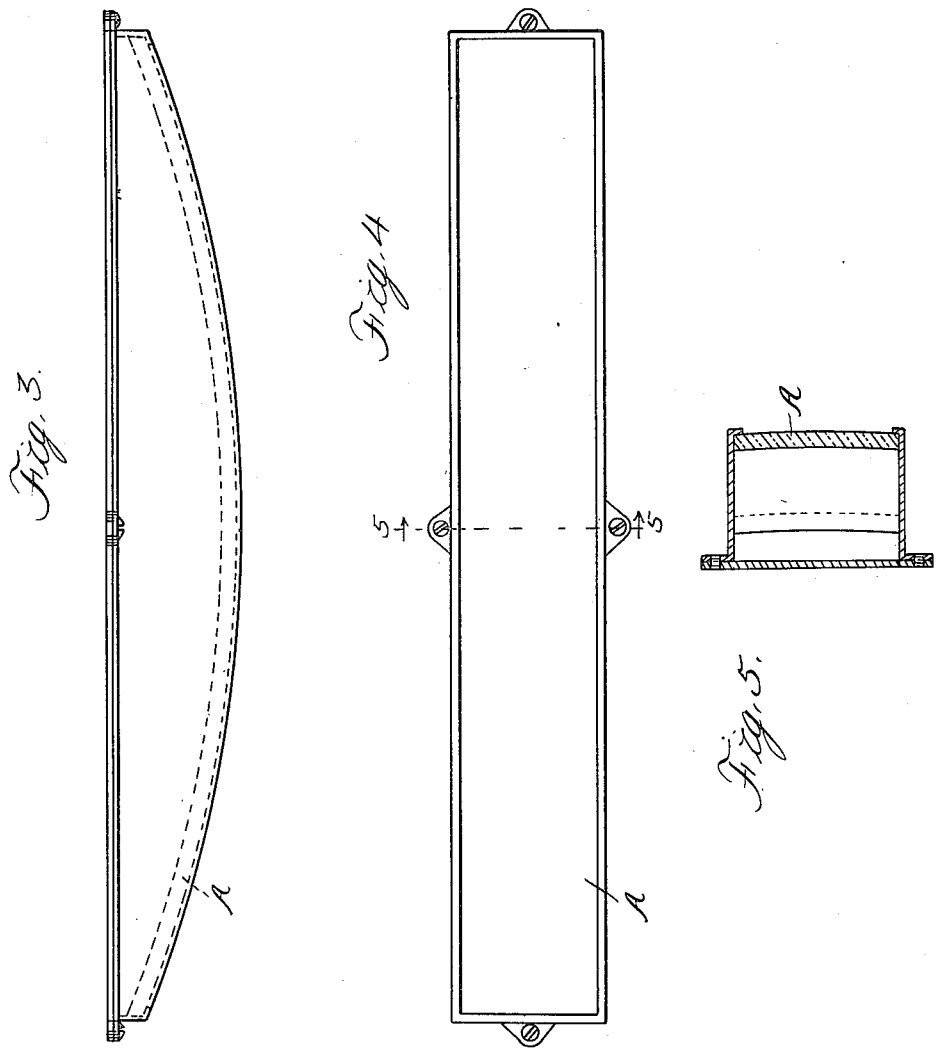
INVENTORS
Dean M. Solenberger
Arthur G. Jager
BY Whittemore Hulbert
   Whittemore & Belknap
ATTORNEYS Patented Apr. 16, 1929.

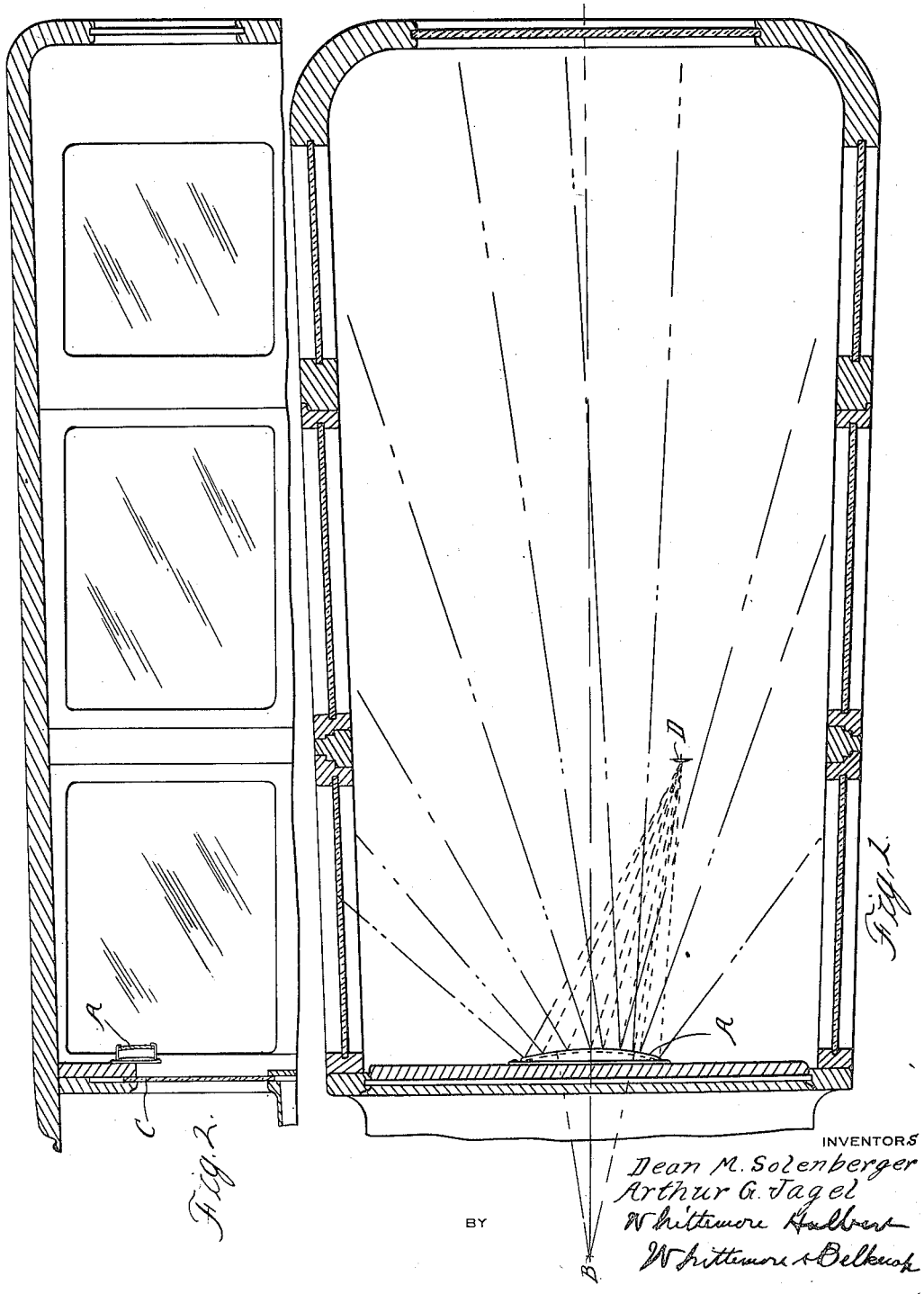

1,709,752

UNITED STATES PATENT OFFICE.

DEAN M. SOLENBERGER, OF CLEVELAND, AND ARTHUR G. JAGEL, OF CLEVELAND HEIGHTS, OHIO, ASSIGNORS TO THE SIMPLEX PISTON RING COMPANY OF AMERICA, INC., OF CLEVELAND, OHIO, A CORPORATION OF OHIO.

REAR-VISION MIRROR.

Application filed January 4, 1929. Serial No. 330,295.

The invention relates to rear vision mirrors such as used upon motor cars. In the present state of the art such mirrors are of several types. For open cars they are frequently mounted so as to extend outside of the car body, being attached either to the post or mounted on the fender or running board. With this type a convex mirror for reducing the size of the reflected image is frequently used. Another type more generally used in closed cars is a plain oblong mirror arranged at the top of the windshield and at such an angle that the driver can obtain a vision through the rear window of the car. A serious objection to the latter type is that the driver can only see cars that are in view through the rear window and cars on either side are completely concealed. Thus many accidents occur through the driver turning to either right or left and being unaware of the fact that some other car is along side of him or immediately in the rear.

The other type, or mirrors that are arranged external to the car are objectionable in that they are frequently out of commission when most needed. Thus in case of rain or when driving upon a muddy pavement the glass will be so obscured that it will be useless. Furthermore, where the reducing mirrors are used the image seen by the driver is so small as to be misleading and he frequently fails to properly judge distances.

It is the object of the present invention to avoid the objections to both types of mirrors above referred to and to obtain a construction which while mounted within the car and therefore protected from the weather will give a range of vision equal to or better than any mirror external to the car body. It is a further object to accomplish this result without distortion of the image which might be confusing or without such a reduction in size as to be objectionable. Still further it is an object to avoid glare from headlights of cars that are in the rear. Our improvement therefore consists in a construction through which the observer obtains an exceedingly wide angle of glare free clear vision and a non-distorted relatively large image so as to be made aware of the presence of any vehicle at the back or upon either side of his own car up to the point where such vehicle is visible by front vision.

In the drawings:

Figure 1 is a horizontal section through a closed body of an automobile showing our improved mirror and its arrangement in relation thereto;

Figure 2 is a vertical longitudinal section therethrough.

Figure 3 is an enlarged plan view of the mirror; Figure 4 is a front elevation thereof; and Figure 5 is a cross section on line 5—5 of Figure 4.

As before stated, with the usual construction of flat mirror which is used inside the car body, the length of the mirror is only sufficient to render visible from the driver's position the rear window of the car body. A longer flat mirror would increase the range of vision but this would be objectionable for various reasons such as interference with the windshield lifting device or other accessories, and because it would be necessary to move the head from side to side, or swing the eyes from side to side to take in the whole picture. By substituting for the flat mirror a mirror which is a cylindrical segment the same length would include a wider angle of vision but the image would be distorted, being of normal height and greatly diminished in width. If, however, in place of the segment of the cylinder a transversely curved segment or a segment of a sphere is used, this will avoid the distortion and will merely reduce the size of the reflected image so that the whole picture may be taken in at a glance. On the other hand, it is undesirable to greatly reduce the size of the reflection and we therefore make use of a mirror which has the least reduction commensurate with obtaining the desired increase in lateral angle of vision. The preferable angle is one which will include in addition to the rear window all of the side windows of the car which are in rear of the driver's seat. This we have found may be obtained by the use of a spherical mirror having a radius of curvature from twenty inches to fifty inches, preferably about twenty-five and one-half inches. We also preferably arranged the mirrors as to be symmetrical with respect to both sides of the car, the center of the sphere being substantially in the plane of the longitudinal center of the car. If it is desired to be used only by the driver, a shorter length will be sufficient but with the symmetrical arrangement the mirror gives the same range of vision to all other occupants of the car. This is frequently advantageous where the driver's attention is focused on the road in front and where he depends upon the other occupants for informing him as to dangers at the side.

With the construction as described, in use the driver is enabled to follow in the mirror the movement of any vehicle approaching from the rear up to the point to where such vehicle becomes visible through forward vision. Where the eyes are directed straight ahead it is possible to see dimly objects at either side within an angle of slightly less than 180 degrees. As, therefore, the rear vision mirror will include within its range approximately the complementary portion of the 360 degrees, this will insure the observance of everything close enough to the car to be a source of danger. While it is true that the image in the mirror is spread out much after the fashion of a cyclorama, this does not occasion any confusion, for the proportions in height and breadth of the objects observed are substantially true. Thus if a car is approaching from the rear at a faster speed it will first be seen in the central portion of the mirror and will travel from this point to one side or the other, finally disappearing from view at the same time that it comes into view through forward vision.

One serious objection to the use of rear vision mirrors while driving at night time is the glare which is occasioned by the headlights of cars in the rear. We have found that with our curved mirror objectionable glare is entirely eliminated, so that in addition to the advantage of a wider range of vision, there is the distinct advantage of freedom from glare.

While we prefer to make our mirror a segment of a true sphere, this is not absolutely essential as it is not necessary that the radius of curvature should be exactly the same in transverse planes of the mirror. Also, a slight deviation in curvature from a true circular arc would not be objectionable. However, the segment of the sphere is the simplest and the best construction.

While we have described the construction as particularly designed for use on an automobile, it is obvious that it may have more extended uses, as for instance in connection with aeroplanes.

As specifically illustrated in the drawings, A is the oblong convex mirror which is a segment of a sphere, the center of which is indicated at B, the radial length being preferably twenty-five and one-half inches. The mirror A is attached at the top of the windshield C and is symmetrically arranged with respect to the longitudinal central plane of the car. Thus a driver occupying a position with his eye at D will include within his range of vision all of the windows in rear of him on both sides of the car, as indicated by the dotted lines. Substantially the same view will be afforded to a person sitting beside the driver while those on the rear seats are also afforded the same view but with a reduced size of image.

As specifically shown in the drawings, the eye of the driver is located approximately thirty inches distant from the mirror which latter is approximately fifteen inches in length and has a radius of curvature of approximately twenty-five and one-half inches. This results in an included angle of vision of approximately 90°. If, however, the radius of curvature is varied between twenty and fifty inches as above stated, the included angle of vision will be correspondingly varied. The least angle which will extend to the side windows of the car is approximately 25° and this therefore forms the minimum limit which may be used with our improved construction. The maximum serviceable limit is approximately 120°, which would include a portion of the front side windows as indicated by dotted lines.

What we claim as our invention is:

1. A rear vision mirror comprising an oblong convex panel of greater width than height arranged within the car forward of the driver, said panel being curved in transverse planes and of selected radii between the limits of twenty and fifty inches.

2. A rear vision mirror comprising an oblong convex panel of greater width than height arranged within the car forward of the driver, said panel being selectively curved in transverse planes.

3. A rear vision mirror comprising a convex panel of greater width than height, said panel being selectively curved in a horizontal plane to have from a point of observation of approximately thirty inches distant, an included angle of reflection of not less than twenty-five degrees and being also curved in a transverse plane to reduce distortion in the reflected image.

4. A rear vision mirror comprising a convex panel of greater width than height, said panel being selectively curved in a horizontal plane to have from a point of observation approximately thirty inches distant, an included angle of reflection not less than twenty-five degrees or more than one hundred and twenty degrees and being also curved in a transverse plane to reduce distortion in the reflected image.

5. A rear vision mirror comprising a convex panel of greater width than height, said panel being selectively curved in a horizontal plane to have from a point of observation of approximately thirty inches distant, an included angle of reflection of approximately seventy degrees and being also curved in a transverse plane to reduce distortion in the reflected image.

6. A rear vision mirror comprising a convex panel of greater width than height arranged within the car forward of the driver, said panel being selectively curved in a horizontal plane to have from the point of observation of the driver an angle of reflection including the back and a portion of the driver's side of the car, and being also curved in a transverse plane to reduce distortion in the reflected image.

7. A rear vision mirror comprising a convex panel of greater width than height arranged within the car forward of the driver, said panel being selectively curved in a horizontal plane to have from the point of observation of the driver an angle of reflection including the back and portions of both sides of the car and being also curved in a transverse plane to reduce distortion of the reflected image.

8. A rear vision mirror comprising a convex panel of greater width than height, arranged within the car forward of the driver, said panel being selectively curved in a horizontal plane to have from the point of observation of the driver an angle of reflection including the back and both sides of the car in rear of the driver so as to be substantially complementary to the angle of forward vision, and being also curved in a transverse plane to reduce distortion in the reflected image.

9. A rear vision mirror comprising a convex panel of greater width than height, said panel being selectively curved in a horizontal plane with no portion thereof of lesser radius than twenty inches and being also curved in a transverse plane to reduce distortion of the reflected image.

10. A rear vision mirror comprising a convex panel of greater width than height, arranged within the car forward of the driver, said panel being selectively curved in transverse planes whereby the included angle of reflection is increased and distortion and glare are reduced.

In testimony whereof we affix our signatures.

DEAN M. SOLENBERGER.
ARTHUR G. JAGEL.